United States Patent
Zhang

(10) Patent No.: US 8,363,433 B2
(45) Date of Patent: Jan. 29, 2013

(54) HYBRID CONDITIONER FOR A POWER SYSTEM

(75) Inventor: Jinhui Zhang, Wexford, PA (US)

(73) Assignee: GE Energy Power Conversion Technology Limited, Warwickshire (GB)

( * ) Notice: Subject to any disclaimer, the term of this patent is extended or adjusted under 35 U.S.C. 154(b) by 676 days.

(21) Appl. No.: 12/556,032

(22) Filed: Sep. 9, 2009

(65) Prior Publication Data

US 2011/0057517 A1    Mar. 10, 2011

(51) Int. Cl.
*H02J 1/02*     (2006.01)

(52) U.S. Cl. .............................. 363/39; 363/40; 363/41

(58) Field of Classification Search .............. 363/39–41, 363/71; 323/205, 207, 259; 307/36, 105; 327/552

See application file for complete search history.

(56) References Cited

U.S. PATENT DOCUMENTS

| | | | |
|---|---|---|---|
| 3,849,677 A | | 11/1974 | Stacey et al. |
| 4,303,870 A | * | 12/1981 | Nakamura et al. ............ 318/130 |
| 4,812,669 A | | 3/1989 | Takeda et al. |
| 5,072,200 A | | 12/1991 | Ranky |
| 5,321,598 A | | 6/1994 | Moran |
| 5,345,377 A | | 9/1994 | Edwards |
| 5,355,295 A | | 10/1994 | Brennen |
| 5,465,203 A | | 11/1995 | Bhattacharya et al. |
| 5,513,090 A | | 4/1996 | Bhattacharya et al. |
| 5,548,165 A | | 8/1996 | Mohan et al. |
| 5,567,994 A | | 10/1996 | Davis et al. |
| 5,691,626 A | | 11/1997 | Esser et al. |
| 5,693,988 A | | 12/1997 | Bettega et al. |
| 5,731,965 A | * | 3/1998 | Cheng et al. .................... 363/41 |
| 5,757,099 A | * | 5/1998 | Cheng et al. .................. 307/105 |
| 5,910,889 A | | 6/1999 | Larsen et al. |
| 6,385,063 B1 | | 5/2002 | Sadek et al. |
| 7,352,597 B2 | | 4/2008 | Wang et al. |
| 2008/0024951 A1 | | 1/2008 | Mortensen et al. |

OTHER PUBLICATIONS

Peng, Fang-Zhang et al., "A Study of Active Power Filters Using Quad-Series Voltage-Source PWM Converters for Harmonic Compensation", IEEE Transactions on Power Electronics, vol. 5, No. 1, Jan. 1990.

* cited by examiner

*Primary Examiner* — Adolf Berhane
*Assistant Examiner* — Yemane Mehari
(74) *Attorney, Agent, or Firm* — Eckert Seamans Cherin & Mellott, LLC; Philip E. Levy

(57) ABSTRACT

A hybrid conditioner for filtering harmonics in a power system that includes a non-linear load. The hybrid conditioner includes an active filter structured and controlled to filter one or more high-order harmonic currents of the fundamental frequency, and a passive filter structured to filter one or more low-order harmonic currents of the fundamental frequency. The active filter and the passive filter are electrically connected in parallel with one another. The hybrid conditioner may also be for providing reactive power compensation for the power system, wherein the active filter is further controlled to provide a compensatory reactive power for compensating for the reactive power that is consumed by the load. The hybrid conditioner may also provide oscillation dampening for the power system, wherein the active filter is further controlled to damp oscillating currents that exist between the passive filter and the AC source.

28 Claims, 5 Drawing Sheets

HYBRID CONDITIONER FOR A POWER SYSTEM

FIELD OF THE INVENTION

The present invention relates to a hybrid conditioner for a power system, and in particular to a hybrid conditioner for a power system that includes both a passive filter and an active filter connected in parallel with the load of the power system for filtering harmonics and/or providing reactive power compensation and/or oscillation dampening for the power system.

BACKGROUND OF THE INVENTION

When a sinusoidal voltage is applied to a linear load, the current drawn by the load is a sinusoidal current at the same frequency as the voltage (although usually not in phase with the voltage). In contrast, when a sinusoidal voltage is applied to a non-linear load, such as a rectifier, the current drawn by the load is non-sinusoidal. Instead, the current waveform is complex and consists of a series of multiple sinusoidal signals that start at the fundamental frequency of the power system and occur at integer multiples of the fundamental frequency known as harmonics. Harmonic frequencies in a power system are a frequent cause of power quality problems. In addition, power systems designed to function at the fundamental frequency of the system may experience unsatisfactory operation and/or failure when subjected to voltages and currents that contain substantial harmonic elements.

A variable frequency drive is a solid state electronic power converting device used for controlling the rotational speed of an alternating current (AC) electrical motor by controlling the frequency of the electrical power supplied to the motor (as is known, the synchronous speed of an AC motor is determined by the frequency of the AC supply and the number of poles in the stator winding). Typically, a variable frequency drive first converts an AC input power to a DC intermediate power using a rectifier circuit. The DC intermediate power is then converted to a quasi-sinusoidal AC power using an inverter switching circuit.

As noted above, variable frequency drives usually include rectifiers in their front ends. As also noted above, rectifiers, being non-linear, produce harmonics and, sometimes, reactive power. It is always desirable to have filters between the voltage sources and the rectifiers so that the sources are protected from damage by the harmonics and/or reactive power. Traditionally, passive filters have been used for this purpose where they have been tuned to certain harmonic frequencies so that they behave as harmonic sinks. At the same time, the passive filters provide reactive power naturally, although the amount of the reactive power they provide is typically not enough to provide effective compensation for the reactive power described above. While a passive filter performs well in filtering a particular order of harmonics, it tends to couple with the power line impedance to form an oscillation circuit and thus introduces oscillating current. Recently, active filters have also been used for this purpose. Active filters use power electronic devices, such as electronic switches like Insulated Gate Bipolar Transistors (IGBTs), and switch them on and off intelligently so that they compensate for the harmonic current (s) and reactive power.

U.S. Pat. No. 5,321,598 describes an active filter that is used to filter harmonics. It injects current that is 180 degrees out of phase from the load harmonic current to compensate for that harmonic current. U.S. Pat. No. 5,355,295 describes a voltage injection plus current injection topology to compensate for both current harmonics and voltage harmonics. U.S. Pat. No. 5,548,165 describes a hybrid filter that has voltage sharing topology, which is suitable when the voltage rating of the power electronic semiconductor switches is lower than the system voltage. U.S. Pat. No. 4,812,669 and JP 63033006 use hybrid filters to filter harmonics generated by a non-linear load. However, these approaches use passive filters to filter high-order harmonics and active filters to filter low-order harmonics. Such a configuration has merits in that the requirement for the switching frequency of the power electronic semiconductor switches is lower for filtering low-order harmonics.

While the approaches described above have been effective in some applications, there is room for improvement in the area of harmonic filtering, reactive power compensation and/or oscillation dampening for power systems, particularly in high power applications where the electric current requirement for the power electronic devices used therein is one of the driving factors.

SUMMARY OF THE INVENTION

In one embodiment, the present invention provides a hybrid conditioner for filtering harmonics in a power system that includes a non-linear load, such as a variable frequency drive, and an AC source which generates AC power at a fundamental frequency f. The hybrid conditioner includes an active filter structured and controlled to filter one or more high-order harmonic currents of the fundamental frequency f, and a passive filter structured to filter one or more low-order harmonic currents of the fundamental frequency f. The active filter and the passive filter are electrically connected in parallel with one another. In addition, the hybrid conditioner may also be for providing reactive power compensation for the power system. In such an implementation, the active filter is further controlled to provide a compensatory reactive power for compensating for the reactive power that is consumed by the load. In another implementation, the conditioner is also for providing oscillation dampening for the power system. In this implementation, the active filter is further controlled to damp oscillating currents that exist between the passive filter (s) and the AC source.

In another particular embodiment, the invention provides a power system that includes a non-linear load, such as a variable frequency drive, and a hybrid conditioner in the various embodiments just described.

In still a further alternative embodiment, the invention provides a variable frequency drive for providing output power to an AC motor that includes a rectifier and a hybrid conditioner in the various embodiments just described.

In still another embodiment, the invention provides a method of filtering harmonics in a power system that includes a non-linear load, such as a variable frequency drive, and an AC source generating AC power at a fundamental frequency f. The method includes steps of receiving the AC power, filtering one or more high-order harmonic currents of the fundamental frequency f in the power system using one or more active filters, and filtering one or more low-order harmonic currents of the fundamental frequency f in the power system using one or more passive filters. In this method, the one or more active filters and the one or more passive filters are electrically connected in parallel with one another and the non-linear load. In one particular embodiment, the method is also for providing reactive power compensation for the power system, and further includes steps of determining a first reactive power consumed by the load, determining a second reactive power for compensating for the first reactive power, and controlling at least one of the one or more active filters to provide the second reactive power. In yet another particular embodiment, the method is also for providing oscillation dampening for the power system. In this embodiment, the method further includes steps of controlling at least one of the one or more active filters to damp an oscillating current that exists between the passive filter(s) and the AC source.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
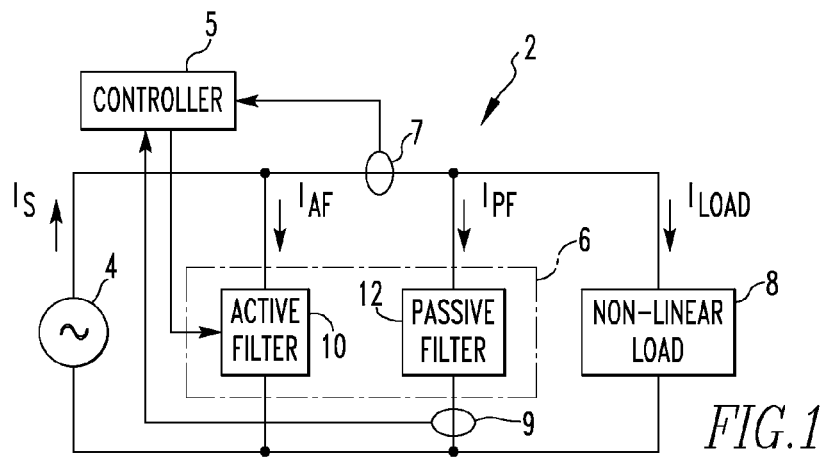
FIG. 1 is a schematic diagram of a power system according to one embodiment of the present invention.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the term "number" shall mean one or an integer greater than one (i.e., a plurality).

As employed herein, the term "passive filter" shall mean an electrical circuit or device consisting of only passive components (e.g., resistors, inductors and capacitors), and not any power electronic devices (as defined herein), that is used to provide a current path for harmonics.

As employed herein, the term "active filter" shall mean an electrical circuit or device including one or more passive components (e.g., resistors, inductors and capacitors), and one or more power electronic devices (as defined herein) that are turned on and off by a controller to actively compensate for harmonics; the controller may be an analog circuit, a digital processor, or a combination of both. The controller may also provide additional control functionality for the associated system.

As employed herein, the term "power electronic device" shall mean a semiconductor switch, including, without limitation, a high voltage, high current semiconductor switch, such as, without limitation, Metal-Oxide-Semiconductor Field Effect Transistors (MOSFETs) and Insulated Gate Bipolar Transistors (IGBTs).

As employed herein, the term "low-order harmonic" shall mean all harmonics of a given fundamental frequency f that are less than or equal to a predetermined threshold harmonic.

As employed herein, the term "high-order harmonic" shall mean all harmonics for a given fundamental frequency f that are greater than a predetermined threshold harmonic.

For example, and without limitation, for a 60 Hz system (fundamental frequency f=60 Hz), the $5^{th}$ order harmonic has a frequency of 5*60 Hz=300 Hz, the $7^{th}$ order harmonic has a frequency of 7*60 Hz=420 Hz, and the $11^{th}$ order harmonic has a frequency of 11*60 Hz=660 Hz. In such a system, the predetermined threshold harmonic may be established as the $5^{th}$ order harmonic. Thus, in such a case, the $5^{th}$ harmonic and all harmonics lower than the $5^{th}$ harmonic (e.g., the $3^{rd}$ harmonic) will be considered "low-order harmonics", and all harmonics higher than the $5^{th}$ order harmonic (e.g., the $7^{th}$ and $11^{th}$ harmonics) will be considered "high-order harmonics." Alternatively, the predetermined threshold harmonic may be established as the $7^{th}$ order harmonic. In such a case, the $7^{th}$ harmonic and all harmonics lower than the $7^{th}$ harmonic (e.g., the $5^{th}$ and $3^{rd}$ harmonics) will be considered "low-order harmonics", and all harmonics higher than $7^{th}$ order harmonic (e.g., the $11^{th}$ harmonic) will be considered "high-order harmonics." The particular predetermined threshold harmonic will be established on a case-by-case basis based on the needs of each system.

Figure 1A:
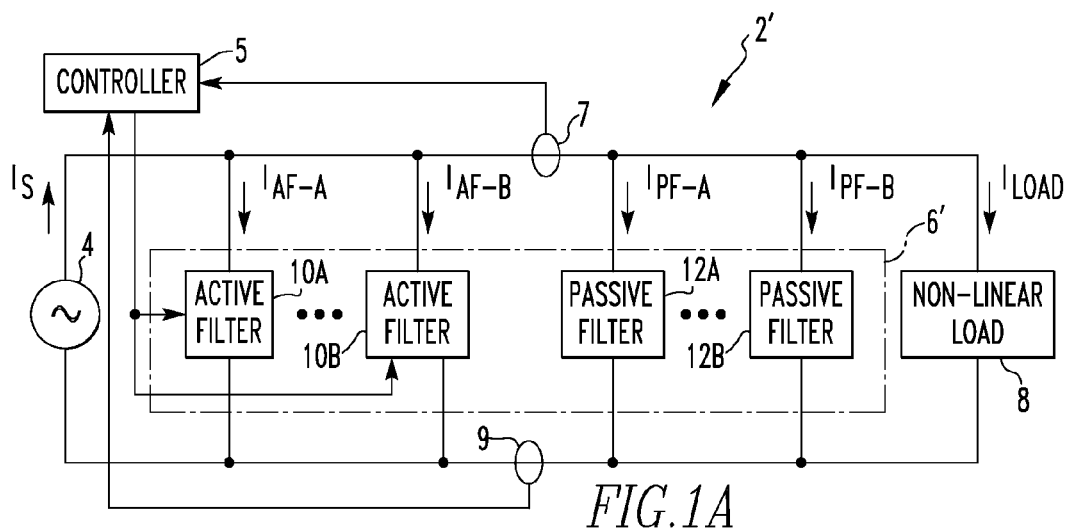
FIG. 1A is a schematic diagram of a power system according to an alternative embodiment of the present invention.

FIG. 1 is a schematic diagram of a power system 2 according to one embodiment of the present invention. The power system 2 comprises an electrical circuit that includes an AC source 4, a hybrid conditioner 6, described in greater detail herein, a controller 5, such as a microprocessor, a microcontroller or another suitable processing device, current sensor 7 (which may be 3 current sensors in the case of a 3 phase system), and a non-linear load 8. The hybrid conditioner 6 includes an active filter 10 and a passive filter 12 connected in parallel with respect to one another. As seen in FIG. 1, the active filter 10 and the passive filter 12 are connected in parallel with the non-linear load 8. Thus, the same voltage is applied to the active filter 10, the passive filter 12, and the non-linear load 8, but the current is divided into separate paths through the active filter 10, the passive filter 12, and the non-linear load 8 (this phenomenon is known as current sharing). It should be understood that while one passive filter 12 is shown in FIG. 1, multiple passive filters 12 provided in parallel as shown in FIG. 1A may also be employed. Similarly, while one active filter 10 is shown in FIG. 1, multiple active filters 10 provided in parallel as shown in FIG. 1A may also be employed.

According to an aspect of the invention, the AC source 4 is structured to generate an AC power signal having a fundamental frequency f, the active filter 10 is structured and controlled by the controller 5 to absorb/filter one or more particular high-order harmonic currents of the fundamental frequency f, and the passive filter 12 is designed, structured and adapted (e.g., tuned) to absorb/filter one or more particular low-order harmonic currents of the fundamental frequency f. More specifically, with respect to the operation of the active filter 10, the current sensor(s) 7 detects the current at the particular location shown, which current is the load current minus the current through the passive filter 12. The active filter 10, through the control of the controller 5 (which turns the switches of the active filter 10 on and off), filters out certain high-order harmonic currents (determined by the predetermined harmonic threshold) of the detected current.

As a result of the above-described arrangement, the active filter 10 and the passive filter 12 share the compensating current. Such an arrangement is advantageous since high-order harmonics have relatively lower amplitudes (as compared to low-order harmonics), which translates into lower current requirements (and thus lower costs) for the power electronic devices that form part of the active filter 10.

As an example, the power system 2 may be a 60 Hz system, the passive filter 12 may be designed to filter currents of the $5^{th}$ order and lower harmonics, and the active filter 10 may be controlled to filter currents of harmonics higher than the $5^{th}$ order harmonic (e.g., the $7^{th}$ and $11^{th}$ order harmonics). In this case, the predetermined threshold harmonic is the $5^{th}$ order harmonic. Alternatively, the power system 2 may be a 60 Hz system, the passive filter may be designed to filter currents of the $7^{th}$ order and lower harmonics (e.g., the $5^{th}$ order harmonic), and the active filter 10 may be controlled to the filter currents of harmonics higher than the $7^{th}$ order harmonic (e.g., the $11^{th}$ order harmonic). In this case, the predetermined threshold harmonic is the $7^{th}$ order harmonic. These examples are meant to be exemplary only and are not meant to be limiting, and it should be understood that other implementations based on various fundamental frequencies and predetermined threshold harmonics are also possible.

Also, if more than one active filter 10 is employed, each active filter 10 may be adapted and structured to share the task of absorbing/filtering one or more particular (and different) high-order harmonic currents of the fundamental frequency f. Similarly, if more than one passive filter 12 is employed, each passive filter 12 may be structured and controlled to absorb/filter one or more particular (and different) low-order harmonic currents of the fundamental frequency f.

Figure 1B:
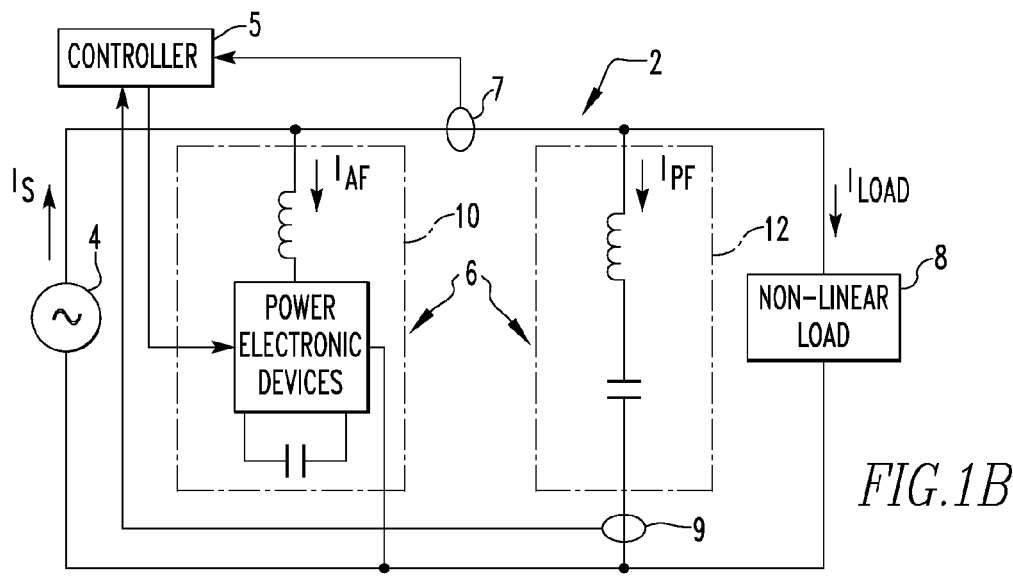
FIG. 1B is a schematic diagram of a particular implementation of the power system of FIG. 1.

FIG. 1B is a bock diagram of the power system 2 according to one particular, exemplary (and non-limiting) topology. The passive filter 12 of this topology includes a series connection of an inductor with an inductance L and a capacitor with a capacitance C. In such a design, the resonant frequency of the passive filter 12 is $1/(2*\pi*\mathrm{sqrt}(L*C))$. The L and C values must be chosen so that the resulting resonant frequency is close to the harmonic frequency of the current to be filtered. For instance, if the $5^{th}$ order harmonic in a 60 Hz system is to be filtered, the L and C values in the passive filter 12 must be chosen so that the resonant frequency is close to 300 Hz (the $5^{th}$ harmonic frequency).

The active filter 10 in this exemplary topology includes a single inductor for a single-phase system (shown) and three inductors for a three-phase system (not shown) coupled in series with an inverter consisting of power electronic devices. The inductor current is modulated to provide desired current. The power electronic devices are connected to a capacitor whose voltage is controlled to be constant. The controller 5 is programmed to turn the power electronic devices on and off as appropriate to filter whatever harmonics are desired to be filtered by controlling the current $I_{AF}$ to compensate for the harmonic current. Such programming is within the ordinary skill of the art and will not be described further herein. The most significant factor limiting what harmonics may be filtered is the highest switching frequency of the power electronic devices of the active filter 10.

Figure 2:
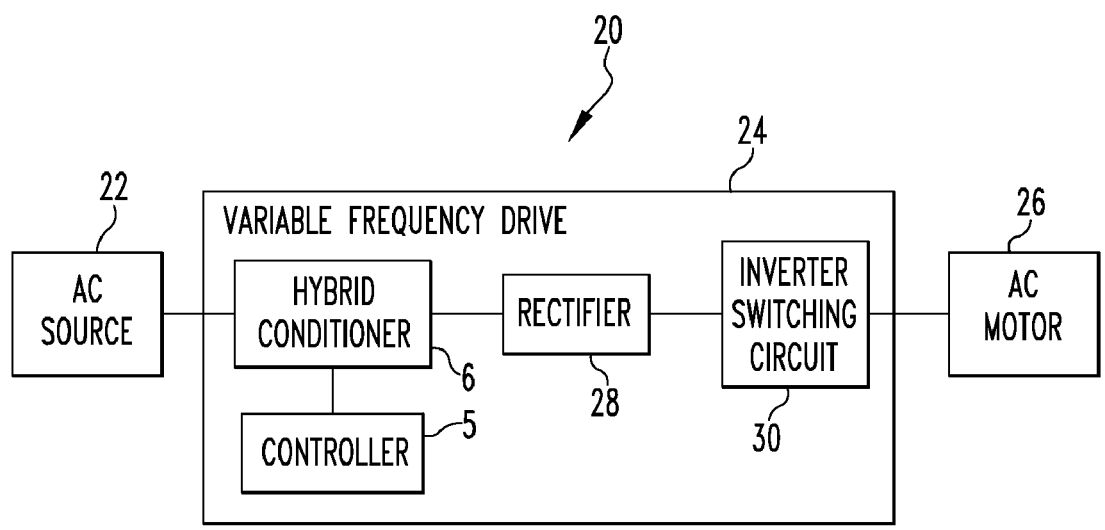
FIG. 2 is a block diagram of a variable frequency drive according to one particular embodiment of the invention.

FIG. 2 is block diagram of an AC motor system 20 according to a particular embodiment of the invention. The AC motor system 20 includes an AC source 22 that is operatively coupled to a variable frequency drive 24. The variable frequency drive 24 is operatively coupled to and drives and controls an AC electric motor 26, which may be, for example and without limitation, a three-phase induction motor. The variable frequency drive 24 includes a rectifier 28, such as, without limitation, a bridge rectifier, that converts the AC input power received from the AC source 22 into a DC intermediate power. The variable frequency drive 24 further includes an inverter switching circuit 30 operatively coupled to the rectifier 28 that converts the DC intermediate power into a quasi-sinusoidal AC power that is provided to the AC motor 26.

As seen in FIG. 2, the variable frequency drive 24 also includes a hybrid conditioner 6 as described elsewhere herein between the AC source 22 and the rectifier 28. The hybrid conditioner 6 includes an active filter 10 and a passive filter 12 connected in parallel with respect to one another and in parallel with respect to the rectifier 28. The active filter 10 is structured and controlled to absorb/filter one or more particular high-order harmonic currents of the fundamental frequency f of the AC source 22, and the passive filter 12 is structured and adapted (e.g., tuned) to absorb/filter one or more particular low-order harmonic currents of the fundamental frequency f of the AC source 22. The controller 5 governs the overall operation of the variable frequency drive 24 (including control of the hybrid controller 6 as described elsewhere herein) based on inputs received through a user interface (not shown) of the variable frequency drive 24. The hybrid conditioner 6 may share the controller 5 with the inverter switching circuit 30, or a separate controller may be provided for controlling each.

As another alternative, the hybrid conditioner 6 can be separate from and connected to a variable frequency drive, in which case the non-linear load (e.g., non-linear load 8 in FIGS. 1, 1A and 1B) that is coupled to the hybrid conditioner 6 would be the variable frequency drive.

According to a further aspect of the present invention, the hybrid conditioner 6 may also be controlled to provide compensation for reactive power in the power system 2 or the AC motor system 20 (this may be done simultaneously with the harmonic filtering described elsewhere herein). As is known in the art, loads tend to be inductive, meaning that they consume reactive power. Reactive power consumption, however, is not desirable as it increases the current amplitude flowing in the circuit and thus increases losses. Compensating for the reactive power consumed by a load will improve power quality, decreases losses, and, if controlled, stabilizes voltage. The hybrid controller 6 may be used to compensate for reactive power consumption by obtaining voltage and current information from the associated system (e.g., power system 2), calculating the reactive power needed to compensate for the reactive power consumption, and turning the power electronic devices of the active filter 10 of hybrid conditioner 6 on and off so that the active filter 10 exhibits as a capacitor which provides the reactive power needed (which changes dynamically) to compensate for the consumed reactive power.

Figure 3:
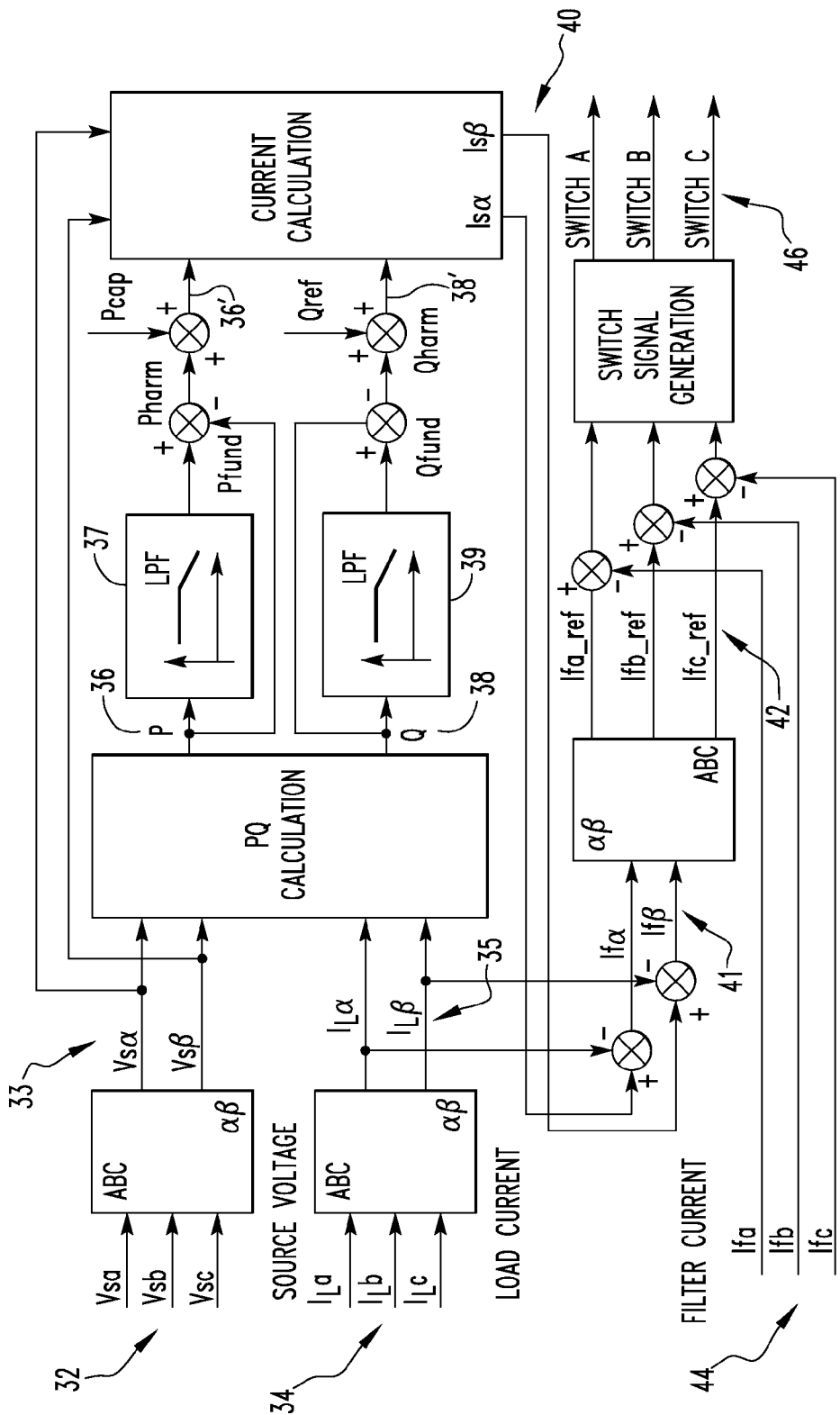
FIG. 3 is a schematic diagram illustrating a method of filtering harmonics and providing reactive power compensation for a three-phase system according to one particular embodiment of the invention.
Figure 4:
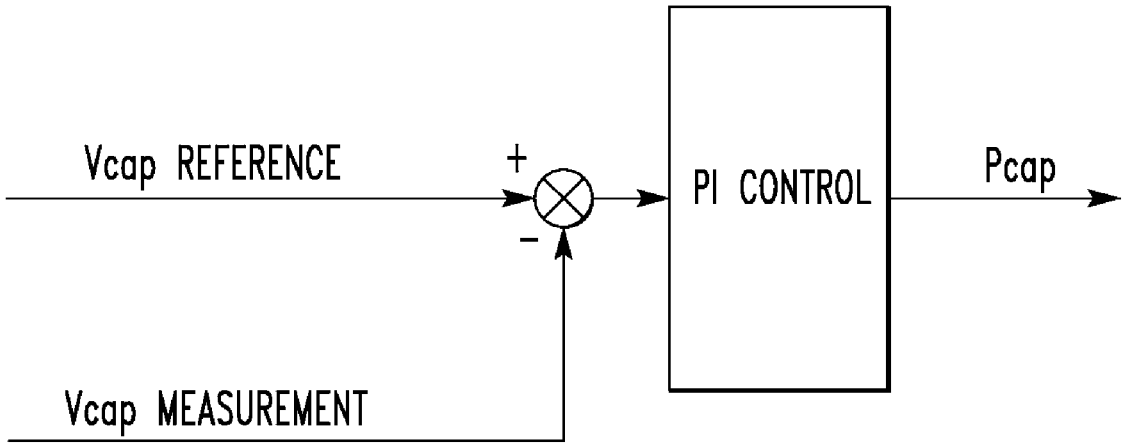
FIG. 4 is a schematic diagram illustrating a method of generating the power reference Pcap shown in FIG. 3 according to one embodiment.
Figure 5:
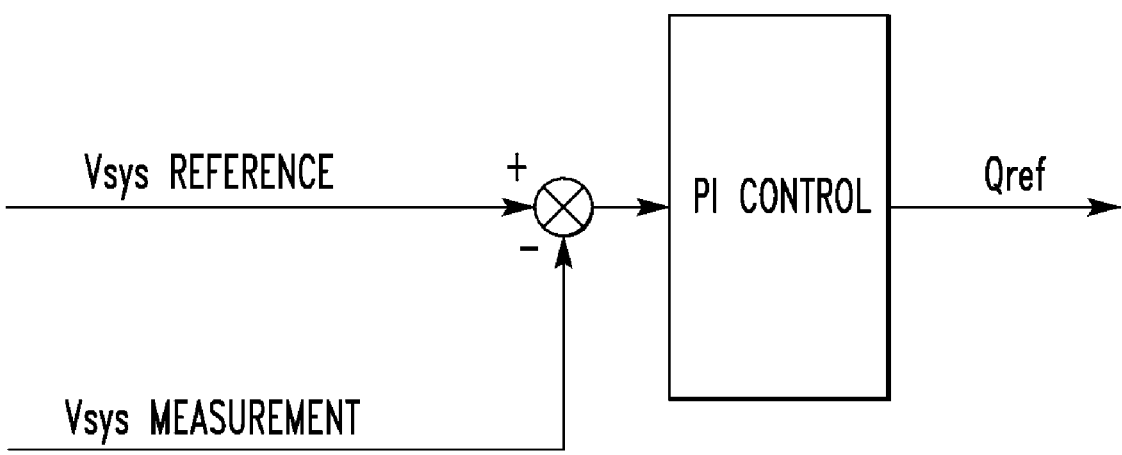
FIG. 5 is a schematic diagram illustrating a method of generating the reactive power reference/command Qref shown in FIG. 3 according to one embodiment.

FIG. 3 is a schematic diagram illustrating one particular method implemented in the controller 5 for employing the hybrid conditioner 6 to filter harmonics and compensate for reactive power consumed by the non-linear load 8 of the power system 2 (which, in the illustrated embodiment is a three-phase system). The method may also be employed in the power system 2' of FIG. 1A or the AC motor system 20 of FIG. 2. As seen in FIG. 3, the controller 5 takes the source voltage 32 and the load current 34, based on measurements made by sensors provided as part of power system 2, translates them into stationary reference frame quantities ($\alpha$, $\beta$), identified by reference numerals 33 and 35, and computes instantaneous power 36 and reactive power 38 consumed by the non-linear load 8. The instantaneous power 36 and reactive power 38 then pass through low-pass filters 37, 39. In order to keep the DC capacitor (of the active filter) voltage constant, a power Pcap needs to be added into the power reference. A method of generating the power reference Pcap according to one embodiment is shown in FIG. 4. As shown in FIG. 4, the measured capacitor voltage is subtracted from a predetermined capacitor voltage reference and the difference is sent to a PI (proportional and integral) control block to generate the power reference Pcap of FIG. 3. In addition, a reactive power reference/command Qref shown in FIG. 3 needs to be added onto the reactive power path to make the active filter 10 provide the desired reactive power. A method of generating the reactive power reference/command Qref according to one embodiment is shown in FIG. 5. As shown in FIG. 5, the system voltage (AC source voltage) is measured and subtracted from a desired system voltage and the difference is sent to a PI control block to generate the reactive power reference/command Qref in FIG. 3. The reactive power reference/command Qref can also be a user input command that user can set to a constant value or a time-varying value.

After filtering and addition as just described, the modified instantaneous power 36' and the modified reactive power 38' are, along with stationary reference frame quantities 33, used to generate an ideal reference source current 40, which is the desired current that flows through the AC source 4. The stationary reference frame quantities 34 are subtracted from the ideal reference source current 40 to generate reference current quantities 41 which are translated into an active filter reference current 42, which is the current in the active filter 10 that will provide the appropriate reactive power compensation. The active filter reference current 42 is then compared to the measured filter current 44 (measured by current sensor(s) 7 in FIGS. 1, 1A and 1B), with the result being used to generate a switching signal 46, which when applied to the power electronic devices of the active filter 10 will turn the switches on and off so that the active filter 10 filters harmonics and provides the reactive power needed to compensate for the consumed reactive power. Pulse width modulation (PWM) or hysteresis control may be employed in the method just described.

Figure 6:
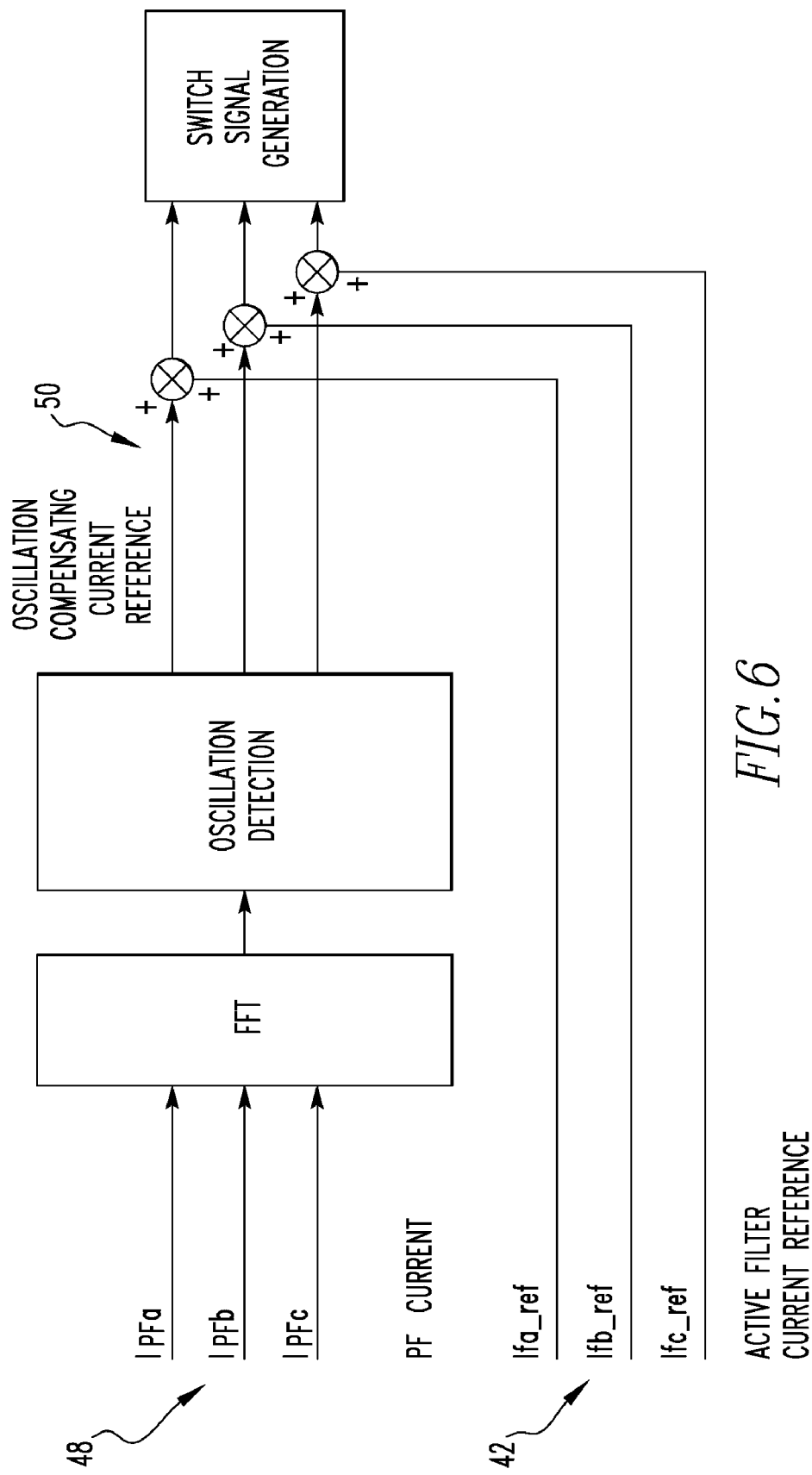
FIG. 6 is a schematic diagram illustrating the signal flow and processing for compensating for the oscillating current that occurs between the AC source and the passive filter(s) described herein according to one particular embodiment.

According to a further aspect of the invention, the controller 5 may also turn the power electronic devices of the active filter 10 on and off in a pattern that causes the active filter 10 to inject current that is 180 degrees out of phase with regard to a detected oscillating current. This will result in dampening of the oscillation (oscillating current) between the source 4 and the passive filter 12, which is also beneficial and desirable. To do so, the current 48 in the passive filter 12 is detected (see, e.g., the current sensor 9 in FIGS. 1, 1A and 1B) and provided to the controller 5. FIG. 6 is a schematic diagram illustrating the signal flow and processing for compensating for the oscillating current that occurs between the AC source 4 and the passive filter(s) 12 according to one particular embodiment. As seen in FIG. 6, the oscillation compensating current 50 is, in this embodiment, added onto the active filter reference current 42 (FIG. 3) before it is used to generate the switching signals 46. The dampening of the oscillating current as just described may be done simultaneously with either or both of the harmonic filtering and the reactive power compensation described elsewhere herein.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A hybrid conditioner for filtering harmonics in a power system having a non-linear load and an AC source generating AC power at a fundamental frequency f, comprising:
   an active filter structured and controlled to filter one or more high-order harmonic currents of said fundamental frequency f; and
   a passive filter structured to filter one or more low-order harmonic currents of said fundamental frequency f;
   wherein said active filter and said passive filter are electrically connected in parallel with one another and with said non-linear load, said hybrid conditioner also being for providing oscillation dampening for said power system, wherein said active filter is further controlled to provide an oscillation compensating current that is 180 degrees out of phase with respect to an oscillating current between said passive filter and said AC source to damp said oscillating current.

2. The hybrid conditioner according to claim 1, further comprising one or more additional active filters, each of said additional active filters being connected in parallel with said active filter and being adapted to filter one or more additional high-order harmonic currents of said fundamental frequency f.

3. The hybrid conditioner according to claim 1, further comprising one or more additional passive filters, each of said additional passive filters being connected in parallel with said passive filter and being adapted to filter one or more additional low-order harmonic currents of said fundamental frequency f.

4. The hybrid conditioner according to claim 1, wherein said fundamental frequency f is 60 Hz, and wherein a predetermined threshold harmonic for determining what is a high-order harmonic and what is a low-order harmonic is a 5th order harmonic of said fundamental frequency f.

5. The hybrid conditioner according to claim 1, wherein said fundamental frequency f is 60 Hz, and wherein a predetermined threshold harmonic for determining what is a high-order harmonic and what is a low-order harmonic is a 7th order harmonic of said fundamental frequency f.

6. The hybrid conditioner according to claim 1, said hybrid conditioner also being for providing reactive power compensation for said power system, wherein said active filter is further controlled to provide a second reactive power for compensating for a first reactive power consumed by said load.

7. The hybrid conditioner according to claim 6, further comprising a controller operatively coupled to and controlling said active filter, said controller being programmed to receive voltage and current information relating to said power system and determine said first reactive power and said second reactive power using said voltage and current information.

8. The hybrid conditioner according to claim 1, wherein said non-linear load is a variable frequency drive.

9. A power system structured to receive AC power from an AC source at a fundamental frequency f, comprising:
- a non-linear load; and
- a hybrid conditioner including:
  - an active filter structured and controlled to filter one or more high-order harmonic currents of said fundamental frequency f; and
  - a passive filter structured to filter one or more low-order harmonic currents of said fundamental frequency f;
  - wherein said active filter, said passive filter and said non-linear load are electrically connected in parallel with one another and said non-linear load, and wherein said active filter is further controlled provide an oscillation compensating current that is 180 degrees out of phase with respect to an oscillating current between said passive filter and said AC source to damp said oscillating current.

10. The power system according to claim 9, further comprising one or more additional active filters, each of said additional active filters being connected in parallel with said active filter and being adapted to filter one or more additional high-order harmonic currents of said fundamental frequency f.

11. The power system according to claim 9, further comprising one or more additional passive filters, each of said additional passive filters being connected in parallel with said passive filter and being adapted to filter one or more additional low-order harmonic currents of said fundamental frequency f.

12. The power system according to claim 9, wherein said fundamental frequency f is 60 Hz, and wherein a predetermined threshold harmonic for determining what is a high-order harmonic and what is a low-order harmonic is a 5th order harmonic of said fundamental frequency f.

13. The power system according to claim 9, wherein said fundamental frequency f is 60 Hz, and wherein a predetermined threshold harmonic for determining what is a high-order harmonic and what is a low-order harmonic is a 7th order harmonic of said fundamental frequency f.

14. The power system according to claim 9, wherein said active filter is further controlled to provide a second reactive power for compensating for a first reactive power consumed by said load.

15. The power system according to claim 14, further comprising a controller operatively coupled to and controlling said active filter, said controller being programmed to receive voltage and current information relating to said power system and determine said first reactive power and said second reactive power using said voltage and current information.

16. The power system according to claim 9, wherein said non-linear load is a variable frequency drive.

17. A variable frequency drive structured to receive AC power from an AC source at a fundamental frequency f and provide output power to an AC motor, comprising:
- a rectifier; and
- a hybrid conditioner including:
  - an active filter structured and controlled to filter one or more high-order harmonic currents of said fundamental frequency f; and
  - a passive filter structured to filter one or more low-order harmonic currents of said fundamental frequency f;
  - wherein said active filter, said passive filter and said rectifier are electrically connected in parallel, and wherein said active filter is further controlled to provide an oscillation compensating current that is 180 degrees out of phase with respect to an oscillating current between said passive filter and said AC source to damp said oscillating current.

18. The variable frequency drive according to claim 17, further comprising one or more additional active filters, each of said additional active filters being connected in parallel with said active filter and being adapted to filter one or more additional high-order harmonic currents of said fundamental frequency f.

19. The variable frequency drive according to claim 17, further comprising one or more additional passive filters, each of said additional passive filters being connected in parallel with said passive filter and being adapted to filter one or more additional low-order harmonic currents of said fundamental frequency f.

20. The variable frequency drive according to claim 17, wherein said fundamental frequency f is 60 Hz, and wherein a predetermined threshold harmonic for determining what is a high-order harmonic and what is a low-order harmonic is a 5th order harmonic of said fundamental frequency f.

21. The variable frequency drive according to claim 17, wherein said fundamental frequency f is 60 Hz, and wherein a predetermined threshold harmonic for determining what is a high-order harmonic and what is a low-order harmonic is a 7th order harmonic of said fundamental frequency f.

22. The variable frequency drive according to claim 17, wherein said active filter is further controlled to provide a second reactive power for compensating for a first reactive power consumed by said rectifier.

23. The variable frequency drive according to claim 22, further comprising a controller operatively coupled to and controlling said active filter, said controller being programmed to receive voltage and current information relating to said variable frequency drive and determine said first reactive power and said second reactive using said voltage and current information.

24. A method of filtering harmonics in a power system having a non-linear load and an AC source generating AC power at a fundamental frequency f, comprising:
- receiving said AC power;
- filtering one or more high-order harmonic currents of said fundamental frequency f in said power system using one or more active filters; and
- filtering one or more low-order harmonic currents of said fundamental frequency f in said power system using one or more passive filters;
- wherein said one or more active filters and said one or more passive filters are provided in a hybrid conditioner, wherein said one or more active filters and said one or more passive filters are electrically connected in parallel with one another and said non-linear load; and
- controlling at least one of said one or more active filters to provide an oscillation compensating current that is 180 degrees out of phase with respect to an oscillating current between said one or more passive filters and said AC source to damp said oscillating current.

25. The method according to claim 24, wherein said fundamental frequency f is 60 Hz, and wherein a predetermined threshold harmonic for determining what is a high-order harmonic and what is a low-order harmonic is a 5th order harmonic of said fundamental frequency f.

26. The method according to claim 24, wherein said fundamental frequency f is 60 Hz, and wherein a predetermined threshold harmonic for determining what is a high-order harmonic and what is a low-order harmonic is a 7th order harmonic of said fundamental frequency f.

27. The method according to claim 24, the method also being for providing reactive power compensation for said power system, the method further comprising determining a first reactive power consumed by said load, determining a second reactive power for compensating for said first reactive power and controlling at least one of said one or more active filters to provide said second reactive power.

28. The method according to claim 24, wherein said nonlinear load is a variable frequency drive.

* * * * *